(12) United States Patent
Iida

(10) Patent No.: US 7,575,033 B2
(45) Date of Patent: Aug. 18, 2009

(54) PNEUMATIC TIRE

(75) Inventor: Eiichi Iida, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 276 days.

(21) Appl. No.: 10/584,380

(22) PCT Filed: Dec. 28, 2004

(86) PCT No.: PCT/JP2004/019597

§ 371 (c)(1),
(2), (4) Date: Jun. 27, 2006

(87) PCT Pub. No.: WO2005/065971

PCT Pub. Date: Jul. 21, 2005

(65) Prior Publication Data

US 2007/0163696 A1    Jul. 19, 2007

(30) Foreign Application Priority Data

Jan. 6, 2004    (JP)    ............... 2004-001404

(51) Int. Cl.
*B60C 15/00*    (2006.01)
*B60C 15/04*    (2006.01)
*B60C 15/05*    (2006.01)

(52) U.S. Cl. ............ 152/539; 152/540; 152/545
(58) Field of Classification Search ............... 152/545
See application file for complete search history.

(56) References Cited

FOREIGN PATENT DOCUMENTS

| JP | 58-105806 | | 6/1983 |
|---|---|---|---|
| JP | 62-270308 | | 11/1987 |
| JP | 05-178033 | | 7/1993 |
| JP | 6-171306 | | 6/1994 |
| JP | 06171322 | * | 6/1994 |
| JP | 06-191238 | | 7/1994 |
| JP | 7-215006 | | 8/1995 |
| JP | 08175126 | * | 7/1996 |
| JP | 11-011116 | | 1/1999 |
| JP | 11-028915 | | 2/1999 |
| JP | 11-301219 | | 11/1999 |
| JP | 200301917 | * | 10/2000 |

* cited by examiner

*Primary Examiner*—Justin Fischer
(74) *Attorney, Agent, or Firm*—Greer, Burns & Crain, Ltd.

(57) ABSTRACT

In a pneumatic tire composed of a carcass layer crossing between a pair of left and right bead cores, the bead cores comprise a fastening bead core for fastening an end of the carcass layer to be turned up around the fastening bead core, and a non-fastening bead core free from the end of the carcass layer. An inner circumferential radius $R_2$ of the non-fastening bead core is set smaller than an inner circumferential radius $R_1$ of the end of the carcass layer to be turned up around the fastening bead core.

2 Claims, 3 Drawing Sheets

PNEUMATIC TIRE

BACKGROUND OF THE INVENTION

1. Field of the Invention

The present invention relates to a pneumatic tire and, more specifically, to a pneumatic tire capable of drastically reducing an eccentric fitting amount relative to a rim.

2. Description of the Related Art

Generally, a carcass layer of a pneumatic tire is configured to be fastened by folding both ends respectively around a pair of left and right bead cores. In this way, by fastening the carcass layer by folding the both ends thereof around the bead cores, it is possible to avoid the ends of the carcass layer from being pulled out of the bead cores when an unvulcanized tire is pressed against an inner surface of a mold from inside by inflating a bladder during vulcanization forming, and to provide carcass cords with uniform tension in order to improve uniformity of the tire.

However, the carcass layer is formed by winding a belt-shaped carcass material in a circumferential direction of the tire and then by splicing the both ends to be overlapped. Accordingly, such spliced portions constitute highly rigid bumps on an inner circumferential surface (an inner diameter side) of each of the bead cores, which is almost formed into a completely round shape. Such bumps would increase a primary eccentric fitting component when the tire is mounted on a rim, and may sometimes cause abnormal vibration when a vehicle is running.

Concerning this problem, as disclosed in Patent Documents 1 and 2, it is possible to prevent protrusion of the bumps of the spliced portions on the inner circumferential surface of the bead core by means of splitting the bead core in two and interposing the end of the carcass layer therebetween instead of folding the end around the bead core. However, when an unvulcanized tire simply configured to interpose the end of the carcass layer between the split portions of the bead core is subjected to vulcanization with a bladder inflation type vulcanizer, the end of the carcass layer may sometimes be pulled out of the bead core when the unvulcanized tire is pushed upward by the bladder. For this reason, it is not possible to employ the vulcanizing method utilizing the bladder inflation for vulcanizing this pneumatic tire. Instead, it is necessary to employ a method of assembling the unvulcanized tire on a surface of a rigid core mold and subjecting the assembled unvulcanized tire directly to thermal vulcanization as disclosed in Patent Document 3.

Nevertheless, in the vulcanizing method using the rigid core mold, it is necessary to form the unvulcanized tire so as to strictly equalize the tension among the carcass cords on the surface of the rigid core mold. Otherwise, widths of ends of the carcass cords to be interposed between the split portions of the bead core may become uneven after thermal contraction of the cords, and uniformity of the tire is thereby deteriorated. Accordingly, this method requires tremendous operations for managing the tension of the carcass cords. As a result, overall operability is substantially reduced and manufacturing costs are increased.

(Patent Document 1) Japanese unexamined patent publication No. 6(1994)-171306

(Patent Document 2) Japanese unexamined patent publication No. 7(1995)-215006

(Patent Document 3) Japanese unexamined patent publication No. 62(1987)-270308

SUMMARY OF THE INVENTION

An object of the present invention is to provide a pneumatic tire for solving the foregoing problem, which is capable of reducing an eccentric fitting amount relative to a rim without causing a cost increase.

To attain the object, the present invention provides a pneumatic tire composed of a carcass layer crossing between a pair of left and right bead cores, in which the bead cores comprise a fastening bead core for fastening an end of the carcass layer to be turned up around the fastening bead core, and a non-fastening bead core free from the end of the carcass layer. Here, an inner circumferential radius $R_2$ of the non-fastening bead core is set smaller than an inner circumferential radius $R_1$ of the end of the carcass layer to be turned up around the fastening bead core.

According to the present invention, the bead core is split into the fastening bead core for fastening the end of the carcass layer and the non-fastening bead core free from fastening. Moreover, the inner circumferential radius $R_2$ of the non-fastening bead core is set smaller than the inner circumferential radius $R_1$ of the end of the carcass layer to be turned up. Accordingly, whereas the non-fastening bead core is mainly used for engagement with the rim by constriction, the fastening bead core is mainly used for fastening the end of the carcass layer to be turned up and does not contribute to the engagement with the rim by constriction. Therefore, the primary eccentric fitting component attributable to the spliced portions of the carcass layer is substantially eliminated, and the eccentric fitting amount relative to the rim is thereby reduced. It is possible to reduce abnormal vibration when a vehicle is running.

Moreover, the ends of the carcass layer are fastened to be turned up around the fastening bead cores. Accordingly, it is possible to vulcanize a green tire by use of the bladder inflation type of vulcanizer, and thereby to manufacture the tire without practically causing a cost increase.

DESCRIPTION OF THE PREFERRED EMBODIMENTS

Now, the present invention will be described more concretely with reference to preferred embodiments shown in the accompanying drawings.

Figure 1:
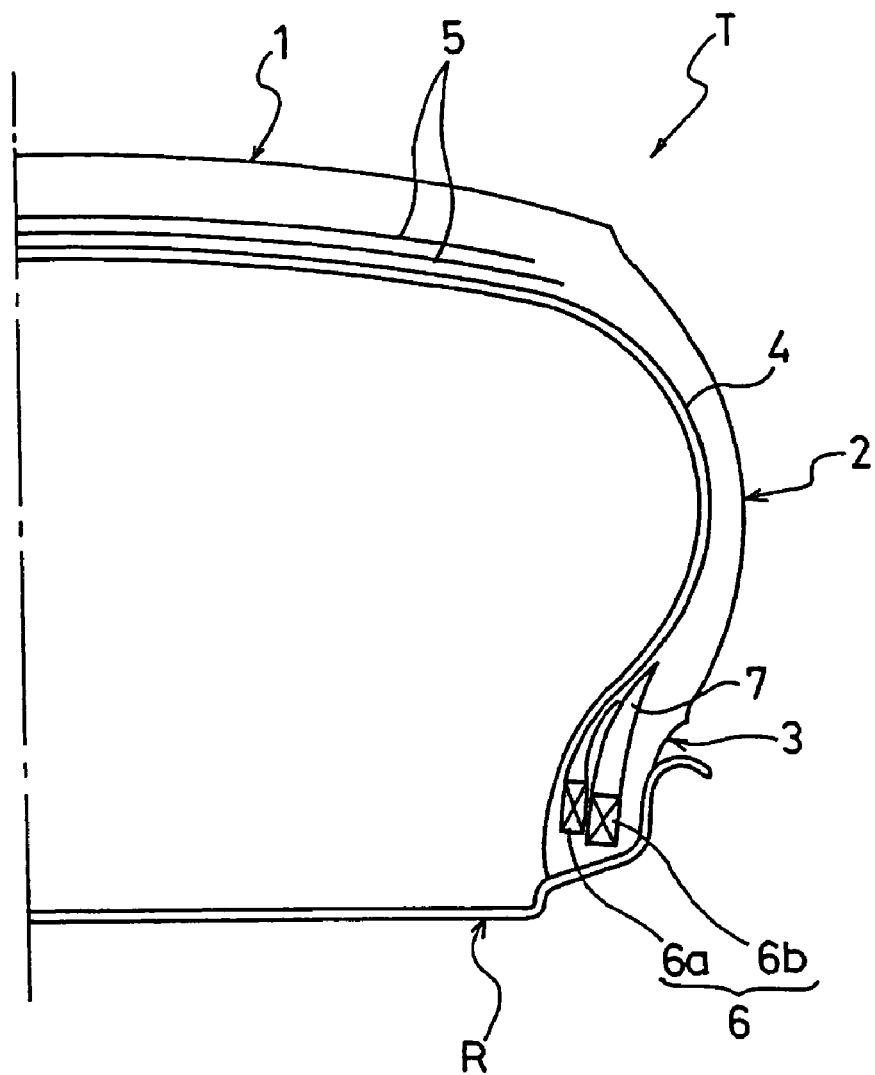
FIG. 1 is a half sectional view showing a pneumatic tire according to an embodiment of the present invention.
Figure 2:
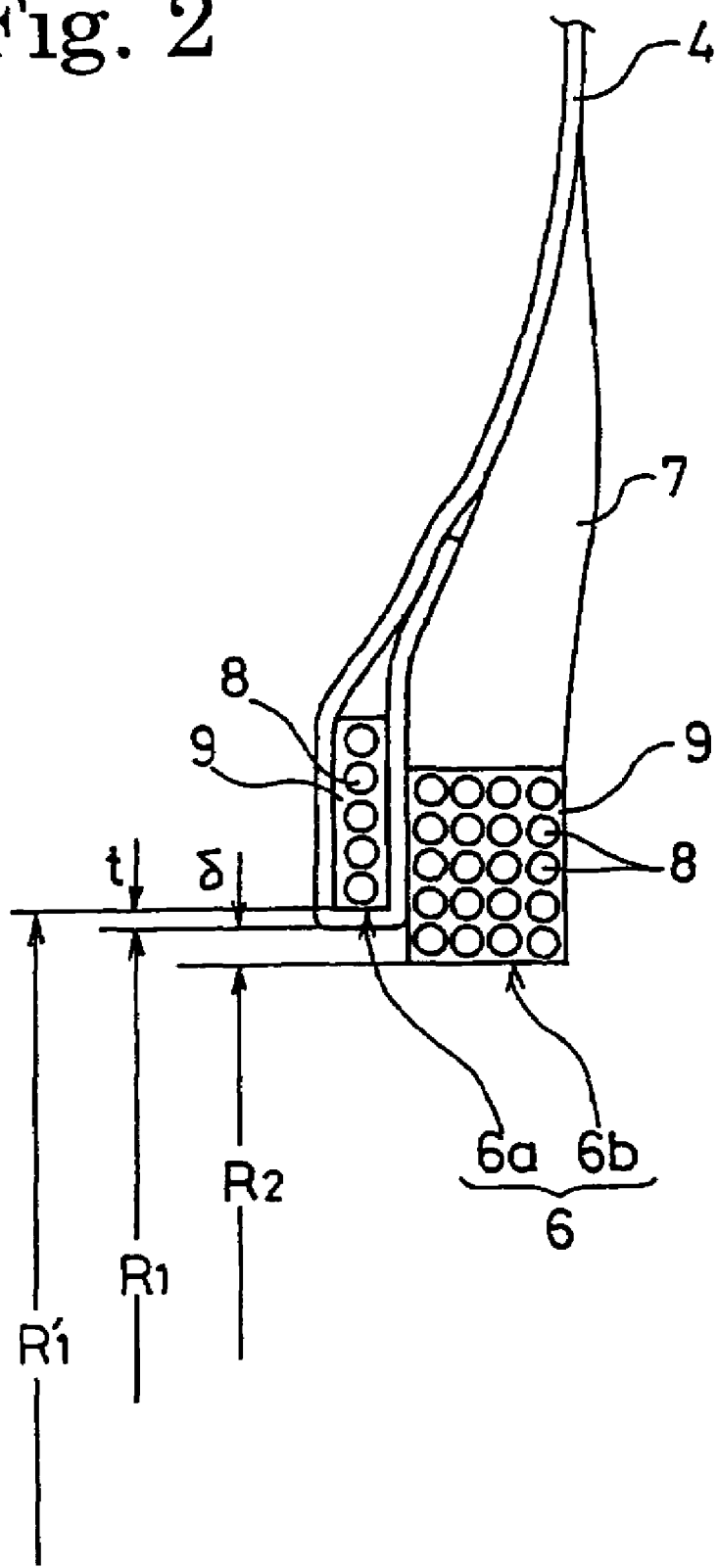
FIG. 2 is an explanatory view showing a substantial part of a bead portion of the pneumatic tire of FIG. 1.

FIG. 1 is a half sectional view showing a pneumatic tire according to an embodiment of the present invention, and FIG. 2 is an explanatory view showing a substantial part around a bead portion thereof.

In a pneumatic tire T shown in FIG. 1, reference numeral 1 denotes a tread portion and sidewall portions 2 and bead portions 3 are continuously formed on both sides of this tread portion 1. The pneumatic tire T is mounted by fitting the bead portions 3 on a rim R. A carcass layer 4 is provided inside the tire, and two-layered belt layers 5 are provided on an outer circumferential side of this carcass layer 4 at the tread portion 1. The carcass layer 4 is arranged so as to spread over the tread portion 1, the sidewall portions 2, and the bead portions 3, and both ends of the carcass layer 4 are fastened to bead cores 6 buried in the bead portions 3.

The bead core 6 is formed into an annular body having an almost completely round shape which extends around the tire. Moreover, as shown in FIG. 2 in detail, the bead cores 6 are composed of a fastening bead core 6a for fastening an end of the carcass layer 4 to be turned up around the fastening bead core from the inside to the outside of the tire, and a non-fastening bead core 6b which does not fasten the end of the carcass layer 4. A bead filler 7 made of hard rubber is provided on the outer circumference of the non-fastening bead core 6b.

Each of the fastening bead core 6a and the non-fastening bead core 6b is formed by winding and overlapping bead wires 8 (steel wires), which are covered with insulation rubber 9, several times in the circumferential direction of the tire. The fastening bead core 6a and the non-fastening bead core 6b are formed in mutually different inner diameters. Specifically, an inner circumferential radius $R_2$ of the non-fastening bead core 6b is set smaller than an inner circumferential radius $R_1'$ of the fastening bead core 6a and smaller than an inner circumferential radius $R_1$ of the end of the carcass layer 4 to be turned up around the fastening bead core 6a. Here, assuming that the thickness of the carcass layer 4 is t, the inner circumferential radius $R_1$ of the end of the carcass layer 4 satisfies a relation of $R_1=R_1'-nt$ (n is the number of carcass layers).

As described above, the fastening bead core 6a and the non-fastening bead core 6b are constituted such that the inner circumferential radius $R_2$ of the non-fastening bead core 6b is set smaller than the inner circumferential radius $R_1$ of the end of the carcass layer 4 in the fastening bead core 6a. Accordingly, the fastening bead core 6a solely contributes to action to fasten the end of the carcass layer 4. On the contrary, the non-fastening bead core 6b solely acts to perform engagement with the rim R by constriction. Therefore, when the pneumatic tire T is mounted on the rim R, an amount that a spliced portion of the carcass layer 4 protrudes out of the inner diameter of the non-fastening bead core 6b is reduced or even eliminated. In this way, it is possible to set a primary eccentric fitting component substantially to zero, and thereby to reduce abnormal vibration when a vehicle is running.

In the present invention, arrangement of the fastening bead core 6a and the non-fastening bead core 6b is not limited to the layout shown in FIG. 2, as long as the relation between the inner circumferential radius $R_2$ of the non-fastening bead core 6b and the inner circumferential radius $R_1$ of the end of the carcass layer 4 is retained as described above. For example, as in an embodiment shown in FIG. 3, it is possible to place the fastening bead core 6a in the middle while placing the non-fastening bead cores 6b on both sides thereof in an axial direction of the tire. Alternatively, as in an embodiment shown in FIG. 4, it is also possible to place the fastening bead core 6a outside the non-fastening bead core 6b in terms of the axial direction of the tire.

Figure 3:
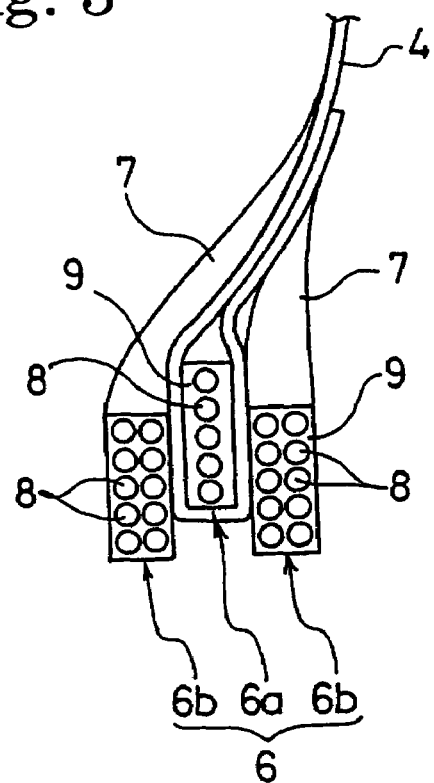
FIG. 3 is an explanatory view showing a substantial part of a bead portion according to another embodiment of the present invention.
Figure 4:
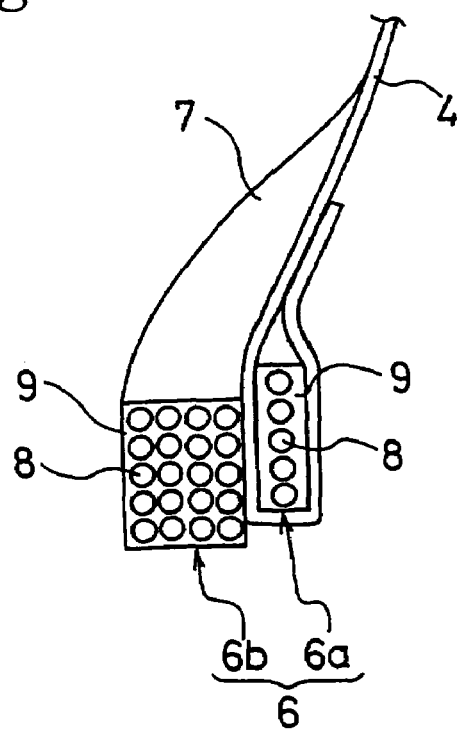
FIG. 4 is an explanatory view showing a substantial part of a bead portion according to still another embodiment of the present invention.

Meanwhile, as exemplified in FIGS. 2, 3, and 4, it is advantageous in light of the manufacturing process to set the folding direction of the end of the carcass layer 4 from the inside to the outside of the tire. However, it is also possible to fold the end of the carcass layer 4 from the outside to the inside when appropriate.

In the present invention, in order to further improve the above-described effect of reducing the eccentric fitting amount, a difference $\delta$ ($=R_1-R_2$) between the inner circumferential radius $R_1$ of the end of the carcass layer 4 to be folded at the fastening bead core 4a and the inner circumferential radius $R_2$ of the non-fastening bead core 6b is set preferably in the range from 0.5 to 1.5 times of the thickness t of the carcass layer 4, or more preferably in the range from 1.0 to 1.5 times thereof. The effect to suppress abnormal vibration is reduced if the difference $\delta$ is smaller than 0.5 times of the thickness t. On the contrary, if the difference $\delta$ is greater than 1.5 times of the thickness t, a contact area with the adjacent bead core annular body is reduced, thereby incurring deterioration of uniformity or an increase in weight attributable to an increase in a sectional width of the bead core annular body.

Dimensions of the fastening bead core solely contributing to fastening the end of the carcass layer are preferably set to the width in the axial direction of the tire in the range from 1 to 3 mm, and the width in the diametric direction of the tire in the range from 4 to 12 mm in terms of the cross section. Moreover, it is preferable to set total tension strength of the fastening bead core equal to or greater than 5 kN. It is possible to support tension of the carcass layer stably by setting the total tension strength equal to or greater than 5 kN.

Here, it is difficult to set the total tension strength equal to or greater than 5 kN if the width of the fastening bead core in the axial direction of the tire is below 1 mm or the width in the diametric direction of the tire is below 4 mm. On the contrary, a region for arranging the non-fastening bead core will be reduced if the width in the axial direction of the tire exceeds 3 mm or the width in the diametric direction of the tire exceeds 12 mm. Such designs may reduce fitting pressure, or adversely affect rigidity of sides of the tire and deteriorate ride comfort.

Although an upper limit of the total tension strength of the fastening bead core is not particularly limited, it is recommended to set the upper limit to about 10 kN in terms of usefulness. Here, the total tension strength means tension strength of the bead core measured with a tension testing machine, in a state where the bead core is cut open while preserving the arrangement of the cords.

Moreover, the insulation rubber for covering the steel cords of the fastening bead core may be the same as the insulation rubber for the non-fastening bead core. However, it is preferable that the insulation rubber for the fastening bead core be relatively harder than the insulation rubber for the non-fastening bead core. By using the harder insulation rubber for the fastening bead core, it is possible to fasten the carcass layer even when a cross-sectional shape (a cross-sectional area) of the fastening bead core is smaller than that of the non-fastening bead core. The hardness of the insulation rubber for the fastening bead core is set preferably in the range from 60 to 98 in terms of JIS-A hardness, or more preferably in the range from 75 to 98. Meanwhile, the thickness thereof is preferably set in the range from 0.1 to 1.5 mm.

The above-described present invention is suitable for application to a pneumatic radial tire. However, it is needless to say that the present invention is also applicable to a bias tire.

EXAMPLES

Two types of pneumatic radial tires (Examples 1 and 2) were fabricated by setting the tire size as 205/65R15 and applying the tire structure as shown in FIG. 1 while providing one carcass layer in common. Meanwhile, the thickness t of the carcass layer, the difference (t+$\delta$) between the inner circumferential radius $R_1'$ of the fastening bead core and the inner circumferential radius $R_2$ of the non-fastening bead core, and the difference $\delta$ between the inner circumferential radius $R_1$ of the end of the carcass layer to be turned up around the fastening bead core and the inner circumferential radius $R_2$ of the non-fastening bead core (a radial difference after turning up) are changed between these tires as shown in Table 1.

On the other hand, a radial tire having a conventional structure (Conventional Example) was fabricated by applying the same tire size as above. However, this tire was different from the above-mentioned tires in that the two types of the bead cores in the tire structure shown in FIG. 1 were incorporated and that the end of the carcass layer was folded and fastened to the incorporated bead cores from the inside to the outside.

The eccentric fitting amounts of the three types of tires were measured in accordance with the following evaluation method. Results are shown in Table 1.

Here, in terms of manufacturing costs of the tires, the tires of Examples 1 and 2 required slightly higher material costs than that of Conventional Example, because the bead cores were split in two. However, costs for vulcanization of these tires were almost equal.

(Eccentric Fitting Amounts)

After mounting each tire for evaluation on a rim, air at regular inner pressure as defined in JATMA was filled therein. Then, differences in the distance between a rim check line and a rim flange were respectively measured in 16 positions evenly located in the circumferential direction, and a difference between the maximum value and the minimum value of the measured distances was obtained.

The evaluation was carried out by use of inverse numbers of the measured values, and the values were expressed by index numbers while setting the inverse number of the measured value of the conventional tire as 100. Accordingly, as the index value becomes greater, the difference and the eccentric fitting amount become smaller.

TABLE 1

|  | Conventional Example | Example 1 | Example 2 |
|---|---|---|---|
| Thickness of Carcass Layer t (mm) | 1.1 | 1.1 | 1.2 |
| Difference in Inner Circumferential Radii of Bead Cores ($R_1{}' - R_2$) (mm) | — | 2.5 | 2.0 |

TABLE 1-continued

|  | Conventional Example | Example 1 | Example 2 |
|---|---|---|---|
| Difference in Inner Circumferential Radii after Turning up ($R_1 - R_2$) (mm) | — | 1.4 | 0.7 |
| Eccentric Fitting Amount (Index) | 100 | 150 | 130 |

What is claimed is:

1. A pneumatic tire composed of a carcass layer crossing between a pair of left and right bead cores, the bead cores comprising:

a fastening bead core for fastening an end of the carcass layer to be turned up around the fastening bead core;

a non-fastening bead core free from the end of the carcass layer; and a second non-fastening bead core, wherein an inner circumferential radius $R_2$ of the non-fastening bead cores is set smaller than an inner circumferential radius $R_1$ of the end of the carcass layer to be turned up around the fastening bead core, and wherein the non-fastening bead cores are respectively placed on both sides of the fastening bead core in an axial direction of the tire.

2. A pneumatic tire composed of a carcass layer crossing between a pair of left and right bead cores, the bead cores comprising:

a fastening bead core for fastening an end of the carcass layer to be turned up around the fastening bead core; and a non-fastening bead core free from the end of the carcass layer, wherein an inner circumferential radius $R_2$ of the non-fastening bead core is set smaller than an inner circumferential radius $R_1$ of the end of the carcass layer to be turned up around the fastening bead core, and wherein a bead filler is disposed only on a side of the non-fastening bead core out of the fastening bead core and the non-fastening bead core.

\* \* \* \* \*